United States Patent [19] [11] 4,138,526
Børresen et al. [45] Feb. 6, 1979

[54] PROCESS FOR PRODUCING GOOD ADHERENCE BETWEEN A METAL AND POLYSULPHIDE MATERIAL AND ARTICLES PRODUCED THEREBY

[75] Inventors: Thor Børresen, Strandgaten 30, 3190, Horten, Norway; Niels U. Harder, Kokkedal, Denmark

[73] Assignee: Thor Børresen, Norway

[21] Appl. No.: 753,089

[22] Filed: Dec. 21, 1976

[30] Foreign Application Priority Data

Dec. 22, 1975 [NO] Norway .................... 754361
Sep. 30, 1976 [DK] Denmark .................... 4408/76

[51] Int. Cl.[2] .................... B32B 27/06
[52] U.S. Cl. .................... 428/419; 427/302; 427/327; 427/388 R; 427/409; 428/457; 148/6.27; 204/38A
[58] Field of Search .................... 427/302, 309, 327, 388 R, 427/409, 419 R; 428/419, 461, 457; 148/627; 156/665; 204/38 A

[56] References Cited

U.S. PATENT DOCUMENTS

| | | | |
|---|---|---|---|
| 2,872,301 | 2/1959 | Massengale et al. | 156/665 |
| 2,942,955 | 6/1960 | Hannah | 156/665 |
| 3,314,811 | 4/1967 | Mitchell et al. | 427/435 |
| 3,457,099 | 7/1969 | DeAngelo et al. | 427/409 |
| 3,664,888 | 5/1972 | Oga et al. | 427/309 |
| 3,734,784 | 5/1973 | Beeday et al. | 427/327 |
| 3,930,078 | 12/1975 | Short | 427/388 R |
| 3,948,865 | 4/1976 | Brady et al. | 427/302 |
| 3,973,998 | 8/1976 | Datta et al. | 427/309 |
| 3,979,543 | 9/1976 | Higbee | 427/388 R |
| 4,000,347 | 12/1976 | Ranney et al. | 427/409 |
| 4,028,205 | 6/1977 | Dorsey | 427/409 |

FOREIGN PATENT DOCUMENTS

| | | | |
|---|---|---|---|
| 827519 | 2/1960 | United Kingdom | 156/665 |

*Primary Examiner*—Michael F. Esposito
*Assistant Examiner*—Sadie L. Childs
*Attorney, Agent, or Firm*—Wenderoth, Lind & Ponack

[57] ABSTRACT

A process for producing a strong and water-resistant bond between aluminum or an aluminum-based alloy and a polysulphide material by means of a primer which is applied to the metal, characterized in that the primer is a solution of a strongly basic alkali metal compound such as alkali metal hydroxides, phosphates and carbonates. The present invention also includes articles treated by the aforementioned process.

9 Claims, No Drawings

PROCESS FOR PRODUCING GOOD ADHERENCE BETWEEN A METAL AND POLYSULPHIDE MATERIAL AND ARTICLES PRODUCED THEREBY

BACKGROUND OF THE INVENTION

For many years, there has been in the industry a need for improving the adherence of polysulphide-based elastic sealing materials to aluminum. This adherence usually tends to weaken upon exposure to water and heat and therefore there has been a particular need to improve the adhesiveness of such materials in a moist and warm environment.

Such improvement in the adherence of polysulphide-based sealing materials to aluminum or aluminum alloys should desirably be achieved irrespective of the point of time at which the metal surface is treated. More particularly, firm adhesion should be achieved without having to subject the surface of the aluminum to a time-consuming treatment immediately before contacting it with the sealing material. The necessity of so surface treating the metal, e.g. constructional elements such as window frame members, prior to adhering the sealing materials thereto would generally be very impractical and should be avoided.

DESCRIPTION OF THE PRIOR ART

It is known to use silane-containing primers for aluminum in connection with the use of said sealing materials. From U.S. Pat. No. 3,457,099, it is also known to add a Friedel-Crafts compound ($AlCl_3$, $BF_3$, etc.) to the silane-based primer. Further, it is known to admix silane into the sealing material itself ("Adhesive Age", November 1974, pages 25–27). Also, phenol resins and polyvinyl acetate have been proposed as agents for improving the adherence between elastomeric sealing materials and various substrates ("Rubber Chemistry and Technology", February 1968, pages 149–151). Thus, there is indeed a comprehensive literature relating to organic sealing materials and their properties. Many different additives and combinations of additives have been proposed to improve the adherence between the sealing materials and the substrate, including aluminum (see for instance "Thioplaste", Leipzig 1971, pages 80–85). This literature shows that the paths of thought hitherto followed have taken the direction towards organic priming agents. Such agents require the use of organic solvents with the substantial drawbacks often associated therewith, and therefore such materials are neither practical nor economical. Pretreatment processes thought to be quite advantageous, on the contrary, should be considered as unsatisfactory solutions to the problems. Moreover, with polysulphide-based sealing materials, such organic primers do not appear to give sufficiently good results with regard to technical efficiency. For instance, silanes tend to undergo hydrolysis when exposed to water and further their primer activity is lost too rapidly.

SUMMARY OF THE INVENTION

It has now been found that a strong and water-resistant bond between aluminum and a polysulphide material can, surprisingly, be achieved in a very efficient, simple and inexpensive way. Namely, it has been discovered that excellent adhesion can be achieved by applying to the aluminum metal a solution of a strongly basic-reacting inorganic alkali metal compound.

DESCRIPTION OF THE PREFERRED EMBODIMENTS

As the inorganic alkali metal compound or base of the present invention, there is preferably used one or more or the strongly basic reacting hydroxides of lithium, sodium or potassium. Also, sodium phosphate, potassium phosphate, sodium silicate and potassium silicate may be employed. Preferred inorganic bases also are carbonates of alkali metals, more particularly, lithium, sodium and potassium.

As a solvent for the inorganic base, there can be used, in principle, any liquid which will dissolve to a sufficient degree the inorganic compound to be included in the primer. It is, however, an advantage of the present process that water can be used as a solvent. Also, lower alcohols can be used as a solvent for the inorganic base or, if desired, mixtures of such alcohols with water. The composition of the solvent is otherwise not critical, since the solvent is to be evaporated from the metal surface after priming.

It has been found that the process of the invention can be used with very good results in connection with electrolytically oxidized or chemically oxidized aluminum, including aluminum-based alloys. However, it is not necessary for the metal to be given such special oxidative treatment. Moreover, aluminum will always have an oxidic film, since the metal is oxidized by the oxygen in the air.

The concentration of base contained in the primer can be quite low and is desirably less than 5% by weight, preferably about 1% by weight. This concentration, however, is not critical or decisive for achieving good results. What is essential, however, is that the metal on priming and subsequent drying has a thin coating of the alkali metal compound contained in the primer.

The primer to be used according to the present invention has proved to be particularly effective in connection with a polysulphide jointing compound based on a polymercaptan polymer.

Aluminum members, often with an anodized surface, are currently being produced for use, i.a. as constructional elements for window frames, with which a polysulphide material is preponderantly used as a sealing compound. The present invention is a very important advance in the art of this field. The primer used according to this invention appears to change the surface structure of the aluminum metal in an advantageous way, the metal obtaining a surface layer of molecules of a basic nature on application of the inorganic base. Thus, according to the present invention, an excellent adherence is achieved between a polysulphide jointing compound and the metal member, the basic layer of molecules apparently acting as an adhesion-promoting agent.

The excellent adhesion between the aluminum and polysulphide jointing compound is of great practical importance, especially where window frames are concerned, since the latter are often exposed to quite drastically changing temperature and humidity conditions. The polysulphide materials which are usually employed with such window frame structures, to be mounted in building structures and jointed to masonry or the like, are based on a polymercaptan polymer (for instance, thiocol LP polymers) which can be converted from a liquid to a solid state by means of an activator.

Among the inorganic bases which can advantageously be used according to the present invention are:

(a) bases having hydroxyl groups in the molecule, for example, LiOH, NaOH and KOH;

(b) phosphates of sodium and potassium, for instance, trisodium phosphate;

(c) carbonates of lithium, sodium and potassium, for instance, $Na_2CO_3$;

(d) silicates of sodium and potassium, for instance, sodium metasilicate.

In the following examples, water and ethylene glycol, respectively, were used as the solvent for the inorganic base.

EXAMPLE 1

Aluminum extrusions which had been electrolytically oxidized were primed at room temperature by immersion in a solution as indicated below (% by weight). The last three tests were included for comparison with Tests 1 to 3 which were carried out according to the present invention.

| Test No. | 1 | 2 | 3 | 4 | 5 | 6 |
|---|---|---|---|---|---|---|
| Water | 98 | 99 | | 98 | | |
| Ethylene glycol | | | 98 | | 98 | |
| $Na_2CO_3$ | 2 | | | | | |
| NaOH | | 1 | 2 | | | |
| $Ca(OH)_2$ | | | | | 2 | |
| $H_2SO_4$ | | | | 2 | | |
| No priming | | | | | | x |

After drying for half an hour (in air at 28° C.), the aluminum extrusions were joined to glass by means of a polysulphide jointing compound, "PRC 408 P" intended for the production of insulating windows. The test samples were then left to cure for one week at room temperature, after which they were stored in water at 70° C. for 4 weeks. After this treatment the adherence between the jointing compound and the metal was tested.

TEST RESULTS

| Tests | 1 | 2 | 3 | 4 | 5 | 6 |
|---|---|---|---|---|---|---|
| 1 week in water at 70° C | K | K | K | A | K | K |
| 2 weeks in water at 70° C | K | K | K | A | 5A | K |
| 3 weeks in water at 70° C | K | K | K | A | 50A | 10A |
| 4 weeks in water at 70° C | 10A | K | K | A | A | A |

A: Rupture by adhesion failure to aluminum.
K: Rupture by cohesion failure of the jointing compound
50A: 50% rupture by adhesion failure to aluminum

EXAMPLE 3

An aluminum extrusion of anodized aluminum was primed by immersion in a 1% by weight aqueous solution of NaOH. Samples were then dried as described in Example 1 above. After a delay of 2, 8, 24 hours and 7, 30 and 180 days, respectively, the samples were joined to glass by means of a polysulphide jointing compound, "PRC 408 P", intended for making insulating windows. After a curing time of 1 week at room temperature, the samples were stored in water at 70° C. for 4 weeks, after which the adherence was tested. In all instances, cohesion rupture of the jointing compound was verified.

EXAMPLE 3

This example is the same as Example 1, Test No. 2, except that KOH and LiOH, respectively, were used in place of NaOH. In both cases, following storage for 4 weeks in water at 70° C., cohesion rupture was verified when testing the adherence.

EXAMPLE 4

This example is the same as Example 1, Test No. 2, except that sodium hexametaphosphate and potassium hydrogen phosphate, respectively, were used in place of NaOH. After curing and storing for 4 weeks at 70° C., cohesion rupture of the jointing compound was verified in both instances.

Similar tests were carried out using silicates of sodium and potassium as the inorganic base. The results obtained in these tests may be characterized as fairly good; however, these bases were not found to be as good as the hydroxides, phosphates and carbonates indicated above.

Further, for comparison, similar tests were carried out using aqueous ammonia as the inorganic base, but with poor results. Ammonia, which is volatile, indeed does not leave a coating on the metal. Tests using ammonium salts gave poor, unsatisfactory results.

Corresponding tests using metals other than aluminum have been carried out, but showed unsatisfactory results.

Tests similar to those of Examples 1–4 above were also carried out using unanodized (untreated) aluminum as well as chemically oxidized aluminum. These tests gave substantially the same good results as when anodized aluminum was employed.

The invention also comprises articles consisting of one or more constructional elements of aluminum, including aluminum-based alloys, and a polysulphide material, especially window frames where a strongly basic reacting alkali metal compound has been applied to the aluminum surface which is in contact with the polysulphide material. In a preferred embodiment, the surfaces of the constructional elements have been chemically or electrolytically oxidized.

Further, the invention comprises constructional elements of aluminum, including aluminum alloys, which are to be used in connection with a polysulphide material, where a primer of a strongly basic reacting alkali metal compound has been applied to the aluminum surfaces to be contacted with the polysulphide material. In a preferred embodiment, the metal is in the form of an electrolytically or chemically oxidized extrusion or related constructional elements.

As will be understood from the above, the process of the invention for obtaining a lasting, strong and water-resistant bond between a polysulphide material and aluminum is a highly effective, simple and inexpensive process to carry out. A particular and very important advantage over the conventional processes is that the surface of the aluminum metal can be treated according to the present invention at any point of time before the metal is to be contacted with the polysulphide material, since the desirable effect of the applied inorganic base is retained for a very long period of time. In fact, for practical purposes, it does not seem to deteriorate on storage. The great advantages of the present invention will be obvious to persons familiar with the art.

We claim:

1. In a process for producing a strong and water-resistant bond between aluminum or an aluminum-based alloy and a polysulphide material by means of a primer applied to the metal which comprises coating the aluminum or aluminum-based alloy with a primer, drying the primer, applying a polysulphide material to the metal coated with the primer and permitting the polysulphide coated on the metal to cure; the improvement wherein the primer is applied to the aluminum or aluminum-based alloy and dried without rinsing, prior to the application of the polysulphide thereto and wherein the primer is a solution consisting essentially of a strongly basic alkali metal compound.

2. The improvement according to claim 1, wherein the alkali metal compound is sodium hydroxide or potassium hydroxide.

3. The improvement according to claim 1, wherein the alkali metal compound is sodium or potassium phosphate.

4. The improvement according to claim 1, wherein the alkali metal compound is sodium carbonate or potassium carbonate.

5. The improvement according to claim 1, wherein the primer is a solution of the alkali metal compound in water, a lower alcohol of mixtures thereof.

6. The improvement according to claim 1, wherein the metal to be treated is an electrolytically or chemically oxidized metal.

7. The improvement according to claim 1, wherein the polysulphide material is a polysulphide jointing compound based on a polymercaptan polymer.

8. Constructional elements of aluminum or an aluminum alloy which are to be used in connection with a polysulphide jointing compound, the improvement wherein a primer of a strongly basic reacting alkali metal compound has been applied to the metal surfaces which are to be contacted with the polysulphide jointing compound.

9. Constructional elements according to claim 8, wherein the aluminum metal is a chemically or electrolytically oxidized metal.

* * * * *